United States Patent
Wright et al.

(10) Patent No.: US 7,630,328 B2
(45) Date of Patent: *Dec. 8, 2009

(54) SIP-BASED SESSION CONTROL

(75) Inventors: Steven A. Wright, Roswell, GA (US); Albert Whited, Atlanta, GA (US); Thomas A. Anschutz, Conyers, GA (US); Randy Zimler, Gainesville, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 651 days.

This patent is subject to a terminal disclaimer.

(21) Appl. No.: 11/026,228

(22) Filed: Dec. 30, 2004

(65) Prior Publication Data

US 2006/0039367 A1 Feb. 23, 2006

Related U.S. Application Data

(60) Provisional application No. 60/602,493, filed on Aug. 18, 2004.

(51) Int. Cl.
*H04L 12/28* (2006.01)
*H04J 3/16* (2006.01)

(52) U.S. Cl. ............ 370/260; 370/395.2; 370/467

(58) Field of Classification Search .......... 370/352, 370/282, 278, 277, 260, 262, 390, 395.72, 370/270, 401, 395.2, 467; 709/207, 227; 709/229; 455/411, 426.1, 503; 719/318; 725/95; 348/14.08; 704/271; 379/114.13; 705/51; 707/3
See application file for complete search history.

(56) References Cited

U.S. PATENT DOCUMENTS

| | | | |
|---|---|---|---|
| 4,935,951 | A | 6/1990 | Robinson et al. |
| 4,993,058 | A | 2/1991 | McMinn et al. |
| 5,012,507 | A | 4/1991 | Leighton et al. |
| 5,161,180 | A | 11/1992 | Chavous |
| RE34,677 | E | 7/1994 | Ray et al. |
| 5,511,111 | A | 4/1996 | Serbetcioglu et al. |
| 5,526,406 | A | 6/1996 | Luneau |
| 5,572,576 | A | 11/1996 | Klausner et al. |
| 5,621,379 | A | 4/1997 | Collins |
| 5,673,304 | A | 9/1997 | Connor et al. |
| 5,724,412 | A | 3/1998 | Srinivasan |
| 5,796,806 | A | 8/1998 | Birckbichler |
| 5,805,587 | A | 9/1998 | Norris et al. |
| 5,883,942 | A | 3/1999 | Lim et al. |

(Continued)

OTHER PUBLICATIONS

U.S. Appl. No. 11/318,110, filed Dec. 2005.
US 5,905,788, 05/1999, Bauer et al. (withdrawn)

*Primary Examiner*—Aung S Moe
*Assistant Examiner*—Awet Haile
(74) *Attorney, Agent, or Firm*—Cantor Colburn LLP

(57) ABSTRACT

These exemplary embodiments utilize Sessions Initiation Protocol (SIP) for admission control. The use of the SIP allows a SIP server itself to perform the admission control function. The use of RSVP linkages is reduced. The use of SIP for admission control allows an application to communicate, or "talk," to a network and to request that resources within the network be reserved. Any communications device that uses sessions may utilize the SIP protocol for admission control. The SIP protocol may be used for unicast and multicast media sessions including video-on-demand and/or multicast video access control.

2 Claims, 13 Drawing Sheets

U.S. PATENT DOCUMENTS

| | | |
|---|---|---|
| 5,940,474 A | 8/1999 | Ruus |
| 5,940,475 A | 8/1999 | Hansen |
| 5,999,525 A | 12/1999 | Krishnaswamy et al. |
| 6,009,148 A | 12/1999 | Reeves |
| 6,011,473 A | 1/2000 | Klein |
| 6,104,800 A | 8/2000 | Benson |
| 6,144,644 A | 11/2000 | Bajzath et al. |
| 6,208,718 B1 | 3/2001 | Rosenthal |
| 6,208,726 B1 | 3/2001 | Bansal et al. |
| 6,215,993 B1 | 4/2001 | Ulveland |
| 6,219,413 B1 | 4/2001 | Burg |
| 6,259,692 B1 | 7/2001 | Shtivelman |
| 6,307,920 B1 | 10/2001 | Thomson et al. |
| 6,310,946 B1 | 10/2001 | Bauer et al. |
| 6,343,115 B1 | 1/2002 | Foldare et al. |
| 6,347,136 B1 | 2/2002 | Horan |
| 6,356,756 B1 | 3/2002 | Koster |
| 6,434,126 B1 | 8/2002 | Park |
| 6,476,763 B2 | 11/2002 | Allen, Jr. |
| 6,512,776 B1 | 1/2003 | Jones |
| 6,529,500 B1 | 3/2003 | Pandharipande |
| 6,529,726 B1 | 3/2003 | Rhodes |
| 6,603,977 B1 | 8/2003 | Walsh et al. |
| 6,608,886 B1 | 8/2003 | Contractor |
| 6,622,016 B1 | 9/2003 | Sladek et al. |
| 6,624,754 B1 | 9/2003 | Hoffman et al. |
| 6,661,785 B1 | 12/2003 | Shang et al. |
| 6,665,388 B2 | 12/2003 | Bedingfield |
| 6,665,611 B1 | 12/2003 | Oran et al. |
| 6,674,745 B1 | 1/2004 | Schuster et al. |
| 6,678,357 B2 | 1/2004 | Stumer et al. |
| 6,680,998 B1 | 1/2004 | Bell et al. |
| 6,703,930 B2 | 3/2004 | Skinner |
| 6,704,576 B1 | 3/2004 | Brachman |
| 6,718,021 B2 | 4/2004 | Crockett et al. |
| 6,724,872 B1 | 4/2004 | Moore |
| 6,751,218 B1 * | 6/2004 | Hagirahim et al. .......... 370/390 |
| 6,771,742 B2 | 8/2004 | McCalmont et al. |
| 6,792,081 B1 | 9/2004 | Contractor |
| 6,804,338 B1 | 10/2004 | Chen |
| 6,816,481 B1 | 11/2004 | Adams |
| 6,842,448 B1 | 1/2005 | Norris et al. |
| 6,868,074 B1 | 3/2005 | Hanson |
| 6,912,399 B2 | 6/2005 | Zirul et al. |
| 6,931,117 B2 | 8/2005 | Roberts |
| 6,940,950 B2 | 9/2005 | Dickinson et al. |
| 6,947,531 B1 * | 9/2005 | Lewis et al. ............ 379/114.13 |
| 7,024,461 B1 * | 4/2006 | Janning et al. .............. 709/207 |
| 7,099,944 B1 * | 8/2006 | Anschutz et al. ........... 709/227 |
| 7,277,858 B1 * | 10/2007 | Weaver et al. ............... 704/271 |
| 2002/0072348 A1 | 6/2002 | Wheeler et al. |
| 2002/0160745 A1 | 10/2002 | Wang |
| 2002/0176404 A1 * | 11/2002 | Girard ........................ 370/352 |
| 2003/0073453 A1 * | 4/2003 | Basilier ...................... 455/503 |
| 2003/0211839 A1 | 11/2003 | Baum et al. |
| 2003/0216148 A1 | 11/2003 | Henderson |
| 2003/0224758 A1 * | 12/2003 | O'Neill et al. .............. 455/411 |
| 2004/0008680 A1 | 1/2004 | Moss et al. |
| 2004/0028062 A1 * | 2/2004 | Pirhonen et al. ............ 370/401 |
| 2004/0037403 A1 | 2/2004 | Koch |
| 2004/0048612 A1 * | 3/2004 | Virtanen et al. .......... 455/426.1 |
| 2004/0057425 A1 | 3/2004 | Brouwer et al. |
| 2004/0101123 A1 | 5/2004 | Garcia |
| 2004/0128694 A1 | 7/2004 | Bantz |
| 2004/0140928 A1 | 7/2004 | Cleghorn |
| 2004/0170159 A1 | 9/2004 | Kim |
| 2004/0194143 A1 | 9/2004 | Hirose |
| 2004/0226045 A1 | 11/2004 | Nadarajah |
| 2004/0233907 A1 | 11/2004 | Hundscheidt et al. |
| 2004/0239754 A1 * | 12/2004 | Shachar et al. ........... 348/14.08 |
| 2004/0244010 A1 * | 12/2004 | Kleyman et al. ............ 719/318 |
| 2005/0007969 A1 | 1/2005 | Hundscheidt et al. |
| 2005/0047574 A1 | 3/2005 | Reid |
| 2005/0050211 A1 * | 3/2005 | Kaul et al. .................. 709/229 |
| 2005/0063519 A1 | 3/2005 | James |
| 2005/0083912 A1 * | 4/2005 | Afshar et al. ............... 370/352 |
| 2005/0144645 A1 * | 6/2005 | Casey et al. .................... 725/95 |
| 2005/0149443 A1 * | 7/2005 | Torvinen ...................... 705/51 |
| 2005/0151642 A1 | 7/2005 | Tupler et al. |
| 2005/0175166 A1 | 8/2005 | Welenson et al. |
| 2005/0190750 A1 | 9/2005 | Kafka et al. |
| 2005/0190892 A1 | 9/2005 | Dawson et al. |
| 2005/0232243 A1 | 10/2005 | Adamczyk |
| 2005/0250468 A1 | 11/2005 | Lu |
| 2005/0281208 A1 * | 12/2005 | Dorenbosch et al. ........ 370/270 |
| 2008/0288458 A1 * | 11/2008 | Sun et al. ....................... 707/3 |

* cited by examiner

SIP-BASED SESSION CONTROL

PRIORITY TO PROVISIONAL APPLICATION

This application claims the benefit of applicants' co-pending U.S. Provisional Application No. 60/602,493 filed on Aug. 18, 2004 of which is incorporated herein by reference.

CROSS REFERENCE TO RELATED APPLICATION

This application relates to applicants' co-pending application entitled "SIP-Based Session Control Among A Plurality Of Multimedia Devices," filed simultaneously herewith, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to computers and to communications and, more particularly, to admission requests and session control in computer networking.

Network admission control is important when delivering service applications to customers. Should a customer request Internet access, video-on-demand, video teleconferencing, IP telephony, interactive gaming, or many other service applications, the service provider must know that adequate bandwidth exists within the network infrastructure. When the customer pays for such service applications, the customer reasonably expects that the available network bandwidth will support such an application. For example, when a customer clicks a pay-per-view button and pays for a movie, that customer expects a "crystal clear" experience. If, however, network bandwidth is only marginally available and the quality of the experience is poor, the customer is understandably dissatisfied. Before a customer is offered a service application, the service provider should know whether that service application can be delivered and supported at a level of quality the customer expects.

Network admission control protocols help determine whether network infrastructure can support a service application. Network admission controls represent an interchange of information between the network elements that support these applications and the elements that initiate the applications. A customer can be offered multiple applications, such as multicast videos (that resemble broadcast TV), unicast video (that resemble pay-per-view services), games, and even voice services. What ever service the customer is offered, the network must be able to support the service. For the service application, there needs to be assurances that the long-lived session as a whole will have the results as necessary to normally operate. For example, in order to coordinate and make sure the next TV that gets turned on, or the next pay preview or the next phone call works, the signaling within the network must determine that the service can be supported. If the signaling determines that the service can be supported, the service is implemented. If, however, the signaling says "no"—the service cannot be supported—the customer's request is deferred. That is, the customer receives some kind of "busy" signal, pop-up message, or other indication that the customer's request will be queued and fulfilled as soon as bandwidth becomes available to support the quality needed for the requested application and/or service.

Network admission control protocols, then, help determine whether network infrastructure can support a service application. Problems with admission control are usually solved by protocols designed specifically for Quality of Service concerns. Admission control in IP networks usually utilizes RSVP protocols. RSVP protocols are typically used between computers and routers to reach reservations of capacity in IP packet networks. A Sessions Initiation Protocol (SIP) server launches an RSVP protocol, and the RSVP protocol creates the resources in the network or the resource reservation network. The problem, however, is that the RSVP linkage is a cumbersome mapping within the SIP server. Another problem is that the RSVP linkage is inefficient when trying to construct admission control across multiple services with different bandwidth requirements and with different service characteristics (such as in the case of unicast and multicast services). What is needed, then, is an admission control protocol that can successfully support multiple service applications, such as multicast service applications and unicast service applications.

SUMMARY

According to exemplary embodiments, the needs described above and other are met by utilizing Sessions Initiation Protocol (SIP) for admission control. Some of the exemplary embodiments described herein allow the SIP server itself to perform the admission control function. Other exemplary embodiments allow SIP-based admission control via a residential gateway, DSLAM, or multimedia content source. The use of RSVP linkages is reduced. The use of SIP for admission control allows an application and/or device to communicate, or "talk," to a network, request that resources within the network be reserved, and receive the requested resource to communicate with a private communications address. Any communications device that uses sessions may utilize the SIP protocol for admission control.

According to an exemplary embodiment, a method for providing a media source using SIP for admission control includes receiving a session initiation protocol invitation from a multimedia device to request a media stream, communicating the session initiation protocol invitation to a multimedia content server, receiving a session initiation protocol confirmation from the multimedia content server to communicate the media stream, receiving and identifying the media stream from the multimedia content server, and communicating the media stream to a private communications address of the multimedia device. The invitation includes the private communications address for communicating with the multimedia device, and the confirmation includes a communications identifier for identifying the media stream. In further embodiments, the method includes communicating the confirmation to the multimedia device. The method may continue with presentation of the media stream to the multimedia device. And, during communication of the media stream to the multimedia device, a user may activate a media control function to control presentation and communication of the media stream. For example, the presentation function may include a fast-forward function, a rewind function, a pause function, a stop function, a bookmark function, a scene jump function, a status function, and/or an alternate presentation function.

According to another exemplary embodiment, a method for providing a media stream to a multimedia system includes ordering a media stream via a session initiation protocol invitation over a communications network to a content media source and communicating the media stream to a private communications address of a multimedia device. Still another exemplary embodiment is directed to a method for providing a media stream to a multimedia system that includes initiating an order for a media stream via a session initiation protocol invitation over a communications network, translating the session initiation protocol invitation to an internet group management protocol join, communicating the internet group management protocol join to order the media stream from a multicast multimedia content server, receiving an internet group management protocol acknowledgement, and identifying the media stream and communicating the media stream to a private communications address of a multimedia device. The multicast multimedia content server accesses, stores, and manages the media stream. And, the acknowledgement includes the communications identifier for identifying the media stream.

Another exemplary embodiment describes a multimedia gateway device that includes a processing device that uses a session initiation protocol communication with a multimedia device to order a media stream from a multimedia content server over a communications network. The processing device includes instructions for receiving the session initiation protocol invitation from the multimedia device to request a media stream, for communicating the session initiation protocol invitation to the multimedia content server via the communications network, for receiving a session initiation protocol confirmation from the multimedia content server via the communications network to communicate the media stream, for receiving and identifying the media stream from the multimedia content server via the communications network, and for communicating the media stream to a private communications address of the multimedia device. And, similar to above, the invitation includes a private communications address for communicating with the multimedia device and the confirmation includes a communications identifier for identifying the media stream.

Still another exemplary embodiment describes a system that includes a media stream source in communication with a multimedia content server, the multimedia content server for accessing the media stream, managing interactive controls of the media stream, and communicating the media stream, and a processing device that uses a session initiation protocol communication of a multimedia device to order a media stream from a multimedia content server via a communications network.

Yet other exemplary embodiments describe computer program products to perform the methods described above. For example, an embodiment describes a storage medium on which is encoded instructions for initiating an order for a media stream via a session initiation protocol invitation over a communications network, for translating the session initiation protocol invitation to an internet group management protocol join, for communicating the internet group management protocol join to order the media stream from the at least one multicast multimedia content server, for receiving an internet group management protocol acknowledgement via the communications network, and for identifying the media stream and communicating the media stream to a private communications address of a multimedia device. And, another exemplary embodiment describes a storage medium on which is encoded instructions for ordering a media stream via a session initiation protocol invitation over a communications network to a content media source and for communicating the media stream to a private communications address of a multimedia device.

Other systems, methods, and/or computer program products according to embodiments will be or become apparent to one with skill in the art upon review of the following drawings and detailed description. It is intended that all such additional systems, methods, and/or computer program products be included within and protected by this description and be within the scope of the present invention.

DESCRIPTION OF THE DRAWINGS

The above and other embodiments, objects, uses, advantages, and novel features are more clearly understood by reference to the following description taken in connection with the accompanying figures, wherein.

DETAILED DESCRIPTION OF EXEMPLARY EMBODIMENTS

Figure 1:
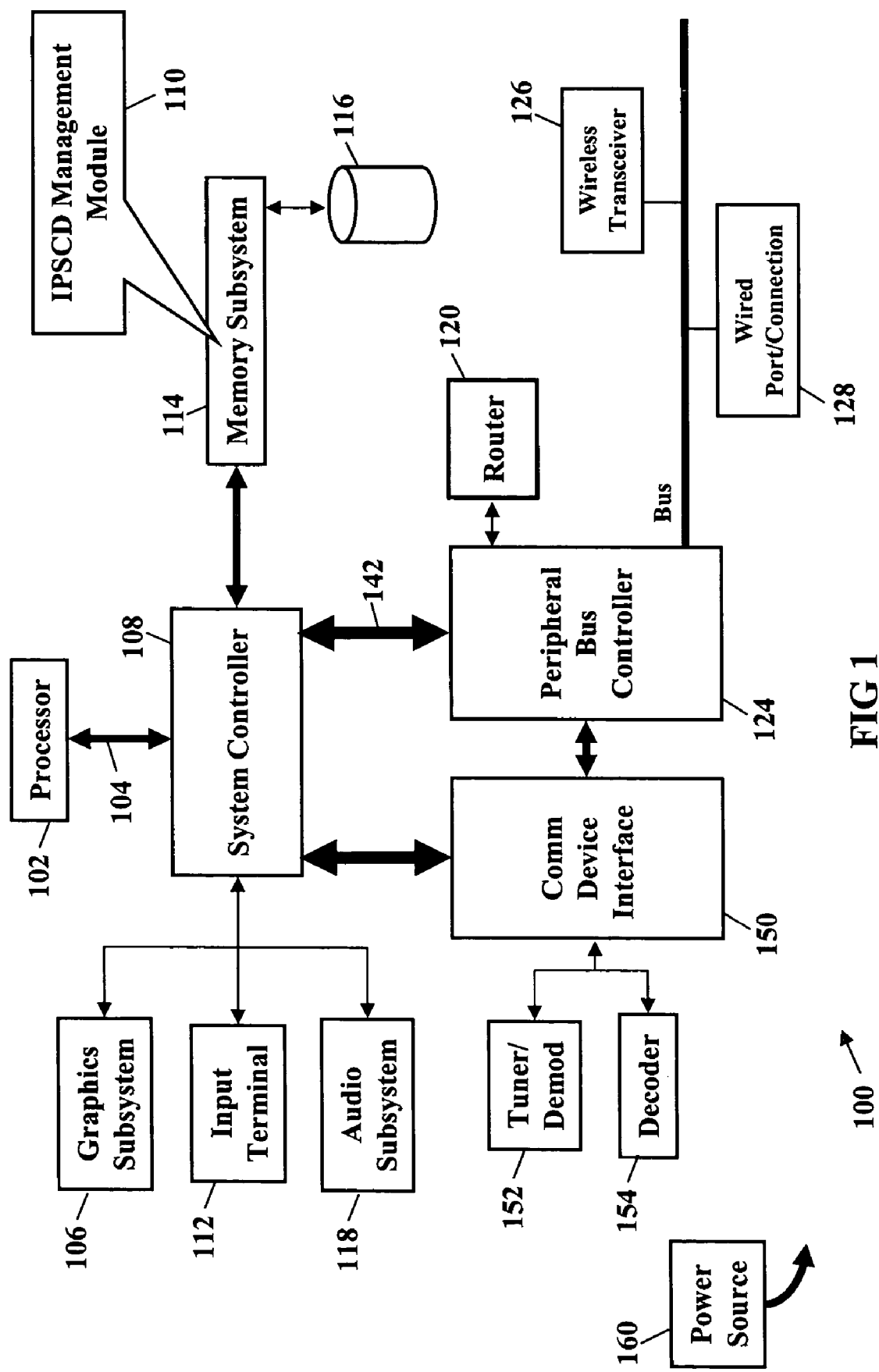
FIG. 1 illustrates a block diagram of exemplary details of a multimedia device according to some of the embodiments of this invention.

The exemplary embodiments now will be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to the exemplary embodiments, Sessions Initiation Protocol (SIP) is used for admission control of a media stream from a content source to a private multimedia device. Some of the exemplary embodiments described herein allow the SIP server itself to perform the admission control function. Other exemplary embodiments allow SIP-based admission control via a residential gateway, DSLAM, or multimedia content source. The use of RSVP linkages is reduced. The use of SIP for admission control allows an application and/or device to communicate, or "talk," to a network, request that resources within the network be reserved, and receive the requested resource to communicate with a private communications address. Any communications device that uses sessions may utilize the SIP protocol for admission control.

The SIP protocol may be used for video-on-demand and/or multicast video access control. One of the advantages, in fact, is that the requesting communications device does not need to know whether the media stream is delivered over a unicast or a multicast media session. User signaling at the application layer for the video service, or for these multimedia services, is performed using SIP. The application layer is using SIP, the network is aware of this, and the network accordingly adjusts. Where communications and/or computing devices proxy messages forward, the equipment in the network is aware of the SIP transactions. The network equipment then makes the necessary changes in the network in response to the SIP transactions. The SIP is used as a networking layer protocol between end points to a session (e.g., a customer's computer or set-top box and a content server). The SIPs can accept a wide range of media types including unicast or multicast IP addresses and Uniform Resource Locators (URLs) to define the location of the media stream. The requesting end point to the media session can be used for media display services such as TVoIP as well as participating in bi-directional media services (e.g., multimedia conferencing).

The exemplary embodiments also utilize URLs. The use of URLs permits the use of a Domain Name Server (DNS) system to provide translation between the URL name and the network address of the media source. This permits a common name space to include multicast and unicast unidirectional media as well as bi-directional services such as multimedia conferencing. The DNS system may be localized to a network of a service provider (e.g., Bellsouth), or published to the public internet.

Because of this architectural approach, the SIP environment now encompasses both multicast and unicast sessions and unidirectional and bidirectional media flows. The SIP protocol identifies all of the IP traffic flows that are substantial enough to be considered as "sessions." Having this unified list of sessions is important for admission control purposes associated with the SIP servers. Because SIP servers know the number of sessions and the types of sessions, SIP servers may implement the resource constraint admission control decision(s), when they also know the resource(s) available and the resource requirements of the various media types. The latter are relatively static data that can be provisioned. For example, if the SIP server providing admission control provides admission control for multiple links and multiple network elements, it may be considered as acting as a type of bandwidth broker. A SIP server implementing admission control scoped within a single network element may also be bundled with that network element. Such an implementation where the SIP server and admission control function are scoped to a Digital Subscriber Line Access Multiplexer (DSLAM) may have implementation advantages in easily facilitating the sessions.

Referring now to the figures, FIG. 1 is a block diagram showing an Internet Protocol Service Consumer Device (IPSCD) Management Module 110 residing in a computer system shown as a multimedia device 100 (also referred to herein as an Internet Protocol Service Consumer Device (IPSCD)). As FIG. 1 shows, the IPSCD Management Module 110 operates within a system memory device. The IPSCD Management Module 110, for example, is shown residing in a memory subsystem 114. The IPSCD Management Module 110, however, could also reside in flash memory or a peripheral storage device 116. The multimedia device 100 also has one or more central processors 102 executing an operating system. As one skilled in the art would appreciate, the operating system has a set of instructions that control the internal functions of the multimedia device 100, and furthermore has the capability to communicate a communications signal among the multimedia device 100, a communications network (e.g., reference numeral 210 in FIG. 2), and/or a connected electronic device capable of communicating audio, graphical, and/or other sensory data (e.g., a TV integrated with the multimedia device 100, a wireless transceiver in an electronic device such as a remote control device, an appliance, a communications device, and/or other devices).

The system controller 108 provides a bridging function between the one or more central processors 102, a video/graphics subsystem 106, an input terminal 112, and an audio subsystem 118, the memory subsystem 114, a PCI (Peripheral Controller Interface) bus, and a Communications ("Comm") Device Interface 150. The PCI bus is controlled by a Peripheral Bus Controller 124. The Peripheral Bus Controller 124 (typically called a "Southbridge") is an integrated circuit that serves as an input/output hub for various peripheral ports and/or transceivers. The Peripheral Bus Controller 124 allows for communications with the communications network and any connected electronic device. The peripheral ports allow the multimedia device 100 to communicate with a variety of devices through networking ports (such as SCSI or Ethernet, not shown) and/or transceivers that include Wireless Communications ("Comm") Device Transceiver 126 (for communication of any frequency signal in the electromagnetic spectrum, such as, for example, Wireless 802.11 and Infrared) and Wired Communications ("Comm") Device Port/Connection 124 (such as modem V90+ and compact flash slots). These peripheral ports could also include other networking ports, such as, a serial port (not shown) and/or a parallel port (not shown). Further, a tuner/demodulator 152 may receive encoded digital signals (e.g., signals from a satellite receiver, a cable feed, and so on) of the media stream. The digital signals are divided into audio and video signals. The tuner/demodulator 152 tunes to the frequency of the media stream. The tuner/demodulator 152 feeds the digital signals into a decoder 154 (either directly or via the Communications Device Interface 150 ). The tuner/demodulator tunes to the frequency of a selected decoder transport stream that is then decoded and fed to the graphics and audio subsystems 106, 118, such as A/V out jacks to a TV. Further, the multimedia device 100 may include a power source 160, such as a power cord that plugs into an electrical socket, a rechargeable battery to provide power and allow the media deliver device 100 to be portable, and/or others. Additionally, those of ordinary skill in the art understand that the program, processes, methods, and systems described in this patent are not limited to any particular computer system or computer hardware.

As those of ordinary skill in the art would appreciate, the central processor 102 may be implemented with a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular central processor of a manufacturer.

The operating system may be a UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems may include a WINDOWS-based operating system (WINDOWS® is a registered trademark of Microsoft Corporation, One Microsoft Way, Redmond Wash. 98052-6399, 425.882.8080, www.Microsoft.com) and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

Figure 2:
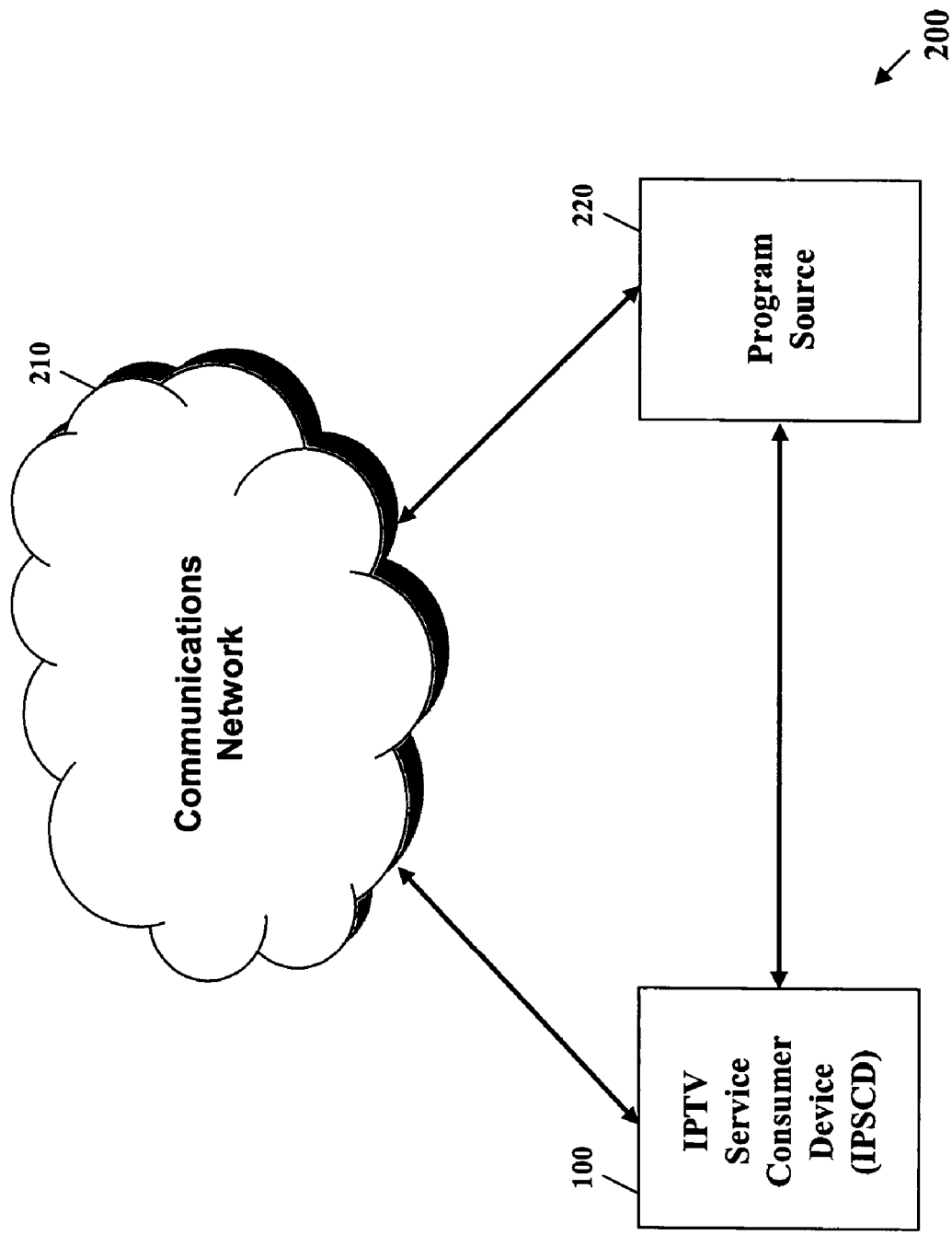
FIG. 2 illustrates an exemplary operating environment for an interactive multimedia system according to some of the embodiments of this invention.

As shown in an embodiment of FIG. 2, the multimedia device 100 communicates with a program source 220 (also referred to herein as a "multimedia content source," a "unicast source," and a "multicast source") using session initiation protocol (SIP) communications over a communications network 210 to order and/or receive a media stream. The media stream may be any RF and/or digital content, such as data files, television/cable programming, .mpg streams, or any other multimedia content. According to an alternate exemplary embodiment, when the media stream is communicated to the multimedia device 100, the media stream may be stored to the memory subsystem 114 and/or to a peripheral storage device 116. According to another exemplary embodiment, the user may communicate the locally stored media steam to another multimedia device or another communications device via the communications network 210. Further, the communications network 210 may be a distributed computing network, such as, for example, a cable network operating in the radio-frequency domain and/or the Internet Protocol (IP) domain. The communications network 210, however, may also include the Internet (sometimes alternatively known as the "World Wide Web"), an intranet, a local-area network (LAN), and/or a wide-area network (WAN). The communications network 210 may include coaxial cables, copper wires, fiber optic lines, and/or hybrid-coaxial lines. The communications network 210 may even include wireless portions utilizing any portion of the electromagnetic spectrum and any signaling standard (such as the I.E.E.E. 802 family of standards).

Figure 3:
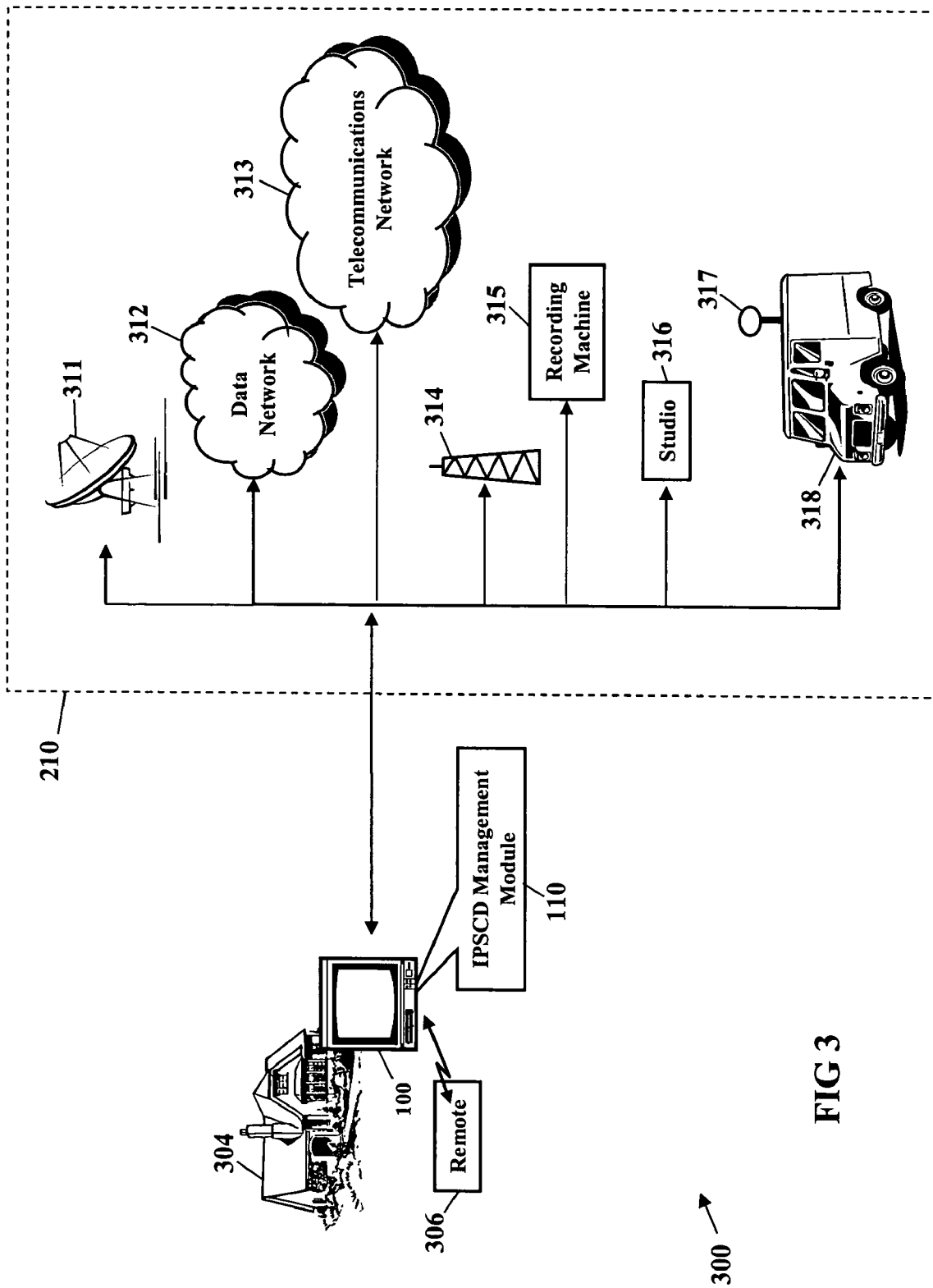
FIG. 3 illustrates another exemplary operating environment for an interactive multimedia system according to some of the embodiments of this invention.

FIG. 3 depicts an exemplary embodiment of SIP-based media delivery operating environment 300 that illustrates a residence 304 with a multimedia device shown as an integrated residential gateway, set top box, and/or television 302 having the IPSCD management module 110, a remote control device 306, and one or more communications networks 210. The multimedia device 100 receives graphics, audio and other forms of the media stream from one or more communications networks that include a variety of broadcasts and communication mediums. As shown in FIG. 3, these broadcast and communications systems may include a direct digital broadcast via satellite TV 311, a communication link with a data communications network 312, a communications link with a telecommunication network 313, a broadcast via digital cable TV 314, and/or a terrestrial broadcast analog and/or digital TV such as a broadcast from a recording device 315, a studio 316, or a mobile vehicle 318 with an antenna and receiver 317. Further, the IPSCD management module 110 may interact with a directory-on-demand service (or an alternate source that provides the media stream) via a web browser or alternate interface to present a menu to a display device of the multimedia device 100. During communication of the media stream, the customer may activate media control of the media stream. For example, the customer may actuate a push button of the remote 306 to activate a fast-forward function, a rewind function, a pause function, a stop function, a bookmark function, a scene jump function, a status function, and an alternate presentation function. When the media control is activated, the multimedia device 100 communicates the selected presentation command to the multimedia content source to alter delivery of the media stream to the multimedia device 100 in accordance with the selected presentation command. Similarly, the customer may activate a communications preference of the media stream. For example, the customer may activate a push button of the remote 306 to terminate transmission of the media stream, to re-direct communication of the media stream to yet another communications device (not shown), or to interrupt communication of the media stream.

According to an exemplary embodiment, the user initiates a request to order the media stream by interfacing with the IPSCD management module 110 and actuating a pushbutton of the remote control device 306, by voice commands, and/or by other selection methods. According to some of the embodiments, the IPSCD management module 110 presents a graphical user interface that enables a broad range of functionality for accessing, billing, controlling presentation, controlling communications, and/or otherwise managing the media stream. For example, an infrared remote control, an input terminal, and/or an optional wireless keyboard can communicate with the multimedia device 100 to interact with the graphical user interface that is presented on an audio/visual device such as a TV screen. According to one of the exemplary embodiment, furniture (e.g., a couch, a chair, a table, and other furniture) having an integrated input terminal, control panel, and/or communications interface with the multimedia device 100 is used to select the media stream to order, view, and/or otherwise manage and to further act as an input/output with the IPSCD management module 110. The graphical user interface may be used to access one or more media streams, associated broadcast and on-demand video and audio content, and associated multimedia applications and services.

Figure 4:
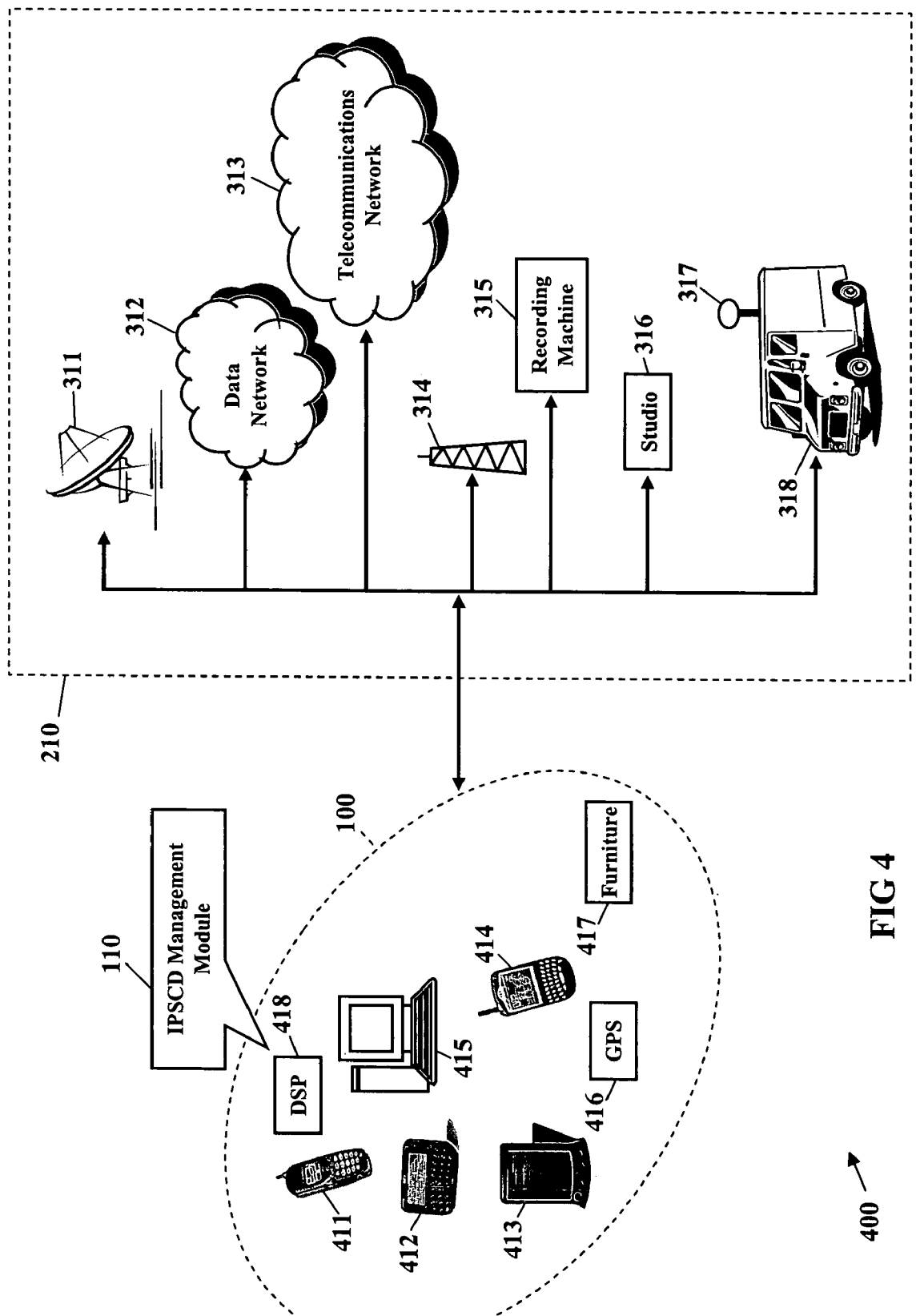
FIG. 4 illustrates yet another exemplary operating environment for an interactive multimedia system according to some of the embodiments of this invention.

FIG. 4 illustrates another exemplary embodiment of SIP-based media delivery operating environment 400 having alternate multimedia devices 100 using session initiation protocol (SIP) communications over a communications network 210 to order and/or receive a media stream. These alternate multimedia devices 100 include a cellular phone 411, an interactive pager 412, a personal digital assistant (PDA) 413, a Voice over Internet Telephony (VoIP) phone 414, a computer system 415, a global positioning system (GPS) 416, a control panel integrated into a piece of furniture such as a couch, chair, or table 417, and any device having a digital signal processor (DSP) 418. Alternate multimedia devices may further include a watch, a radio, vehicle electronics, a clock, a printer, a gateway, and/or another apparatus and system having an AV output. Because these alternate multimedia devices may have limited capabilities, the IPSCD management module 110 may access a remote database to order, access, and/or otherwise manage the media stream and/or associated information and communications with the multimedia content source provider.

Figure 5:
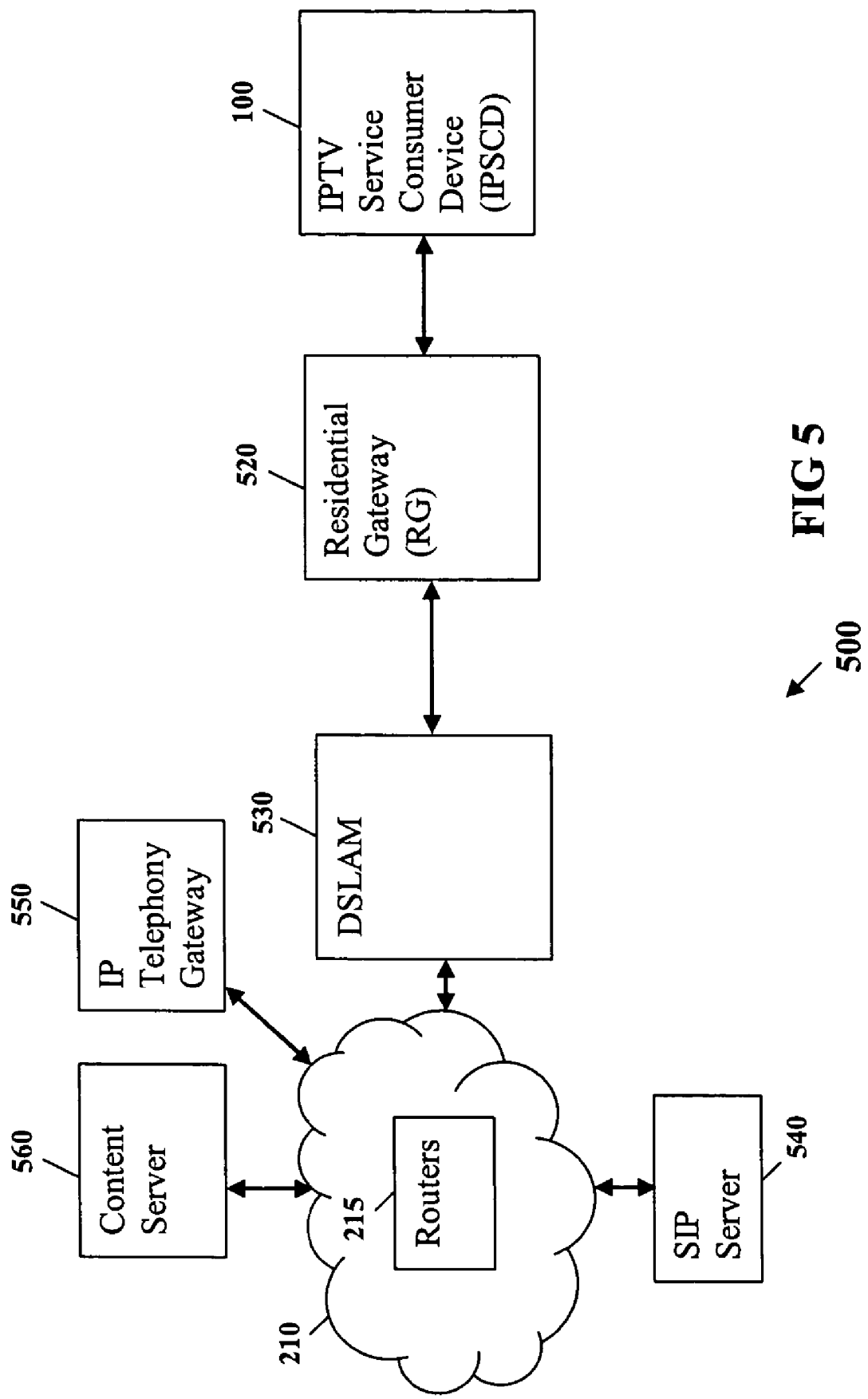
FIG. 5 illustrates still another exemplary operating environment for an interactive multimedia system according to some of the embodiments of this invention.

FIG. 5 illustrates another operating environment 500 for some of the exemplary embodiments. Here, the multimedia device 100 typically resides in a private IP address space, such as a customer's/subscriber's residence or a business network. The multimedia device 100 may be any communications device capable of sending and receiving SIP signaling protocols. A residential gateway (RG) 520 communicates with the multimedia device 100 and provides access to the private IP address space and, thus, to the multimedia device 100. The residential gateway 520 communicates with the communications network 210 via a DSLAM 130. Various routers 215 communicating within the communications network 210 route requests, queries, proxies, signaling, messages, and/or data between an SIP server 540, an IP telephony gateway 550, and/or a content server 560. As shown, the residential gateway 520 may be a stand alone device; however, alternate exemplary embodiments describe the residential gateway 520 integrated with the multimedia device 100.

A viewer (also referred to herein as a "customer" and/or a "subscriber") may initiate a multimedia session at the multimedia device 100 (e.g., by selecting an item from a menu, by clicking on a remote control, by voice commands, and/or by other selection methods as described above). The multimedia device 100 initiates the multimedia session with a SIP request communicated towards the communications network 210. Because a residential or a business network (having the multimedia device 100) is a private address space, the residential gateway 520 usually performs a NAT (Network Address Translation) and/or a PAT (Port Address Translation) function. A SIP Application Layer Gateway is expected to exist within the residential gateway 520 to enable the port dynamic multimedia flows to transit from and/or to the residential gateway 520. The SIP server 540 interprets the SIP invite request and initiates the multimedia session with the appropriate elements. This may involve a variety of actions such as SIP redirection to the IP telephony specific SIP based system, proxy functions to remote the authentication and authorization aspects, establishing unidirectional media flows from the content server 560, and/or establishing or joining multicast flows in the communications network 210. The use of a common session initiation protocol also provides a common mechanism to identify all of the sessions that require admission control decisions based on resource constraints, regardless of the type of service involved.

According to exemplary embodiments, the SIP functionality may be distributed in a variety of ways. In particular, the SIP server 540 may be implemented as a hierarchy of SIP servers (not shown) such that if the first SIP server can not make the decision, the first SIP server acts as a proxy and defers the decision to a higher level SIP server. As an example, one instance of a hierarchy of SIP servers 540 may be implemented at the residential gateway 520 and a higher level SIP server 540 could reside in the communications network 210.

Figure 6:
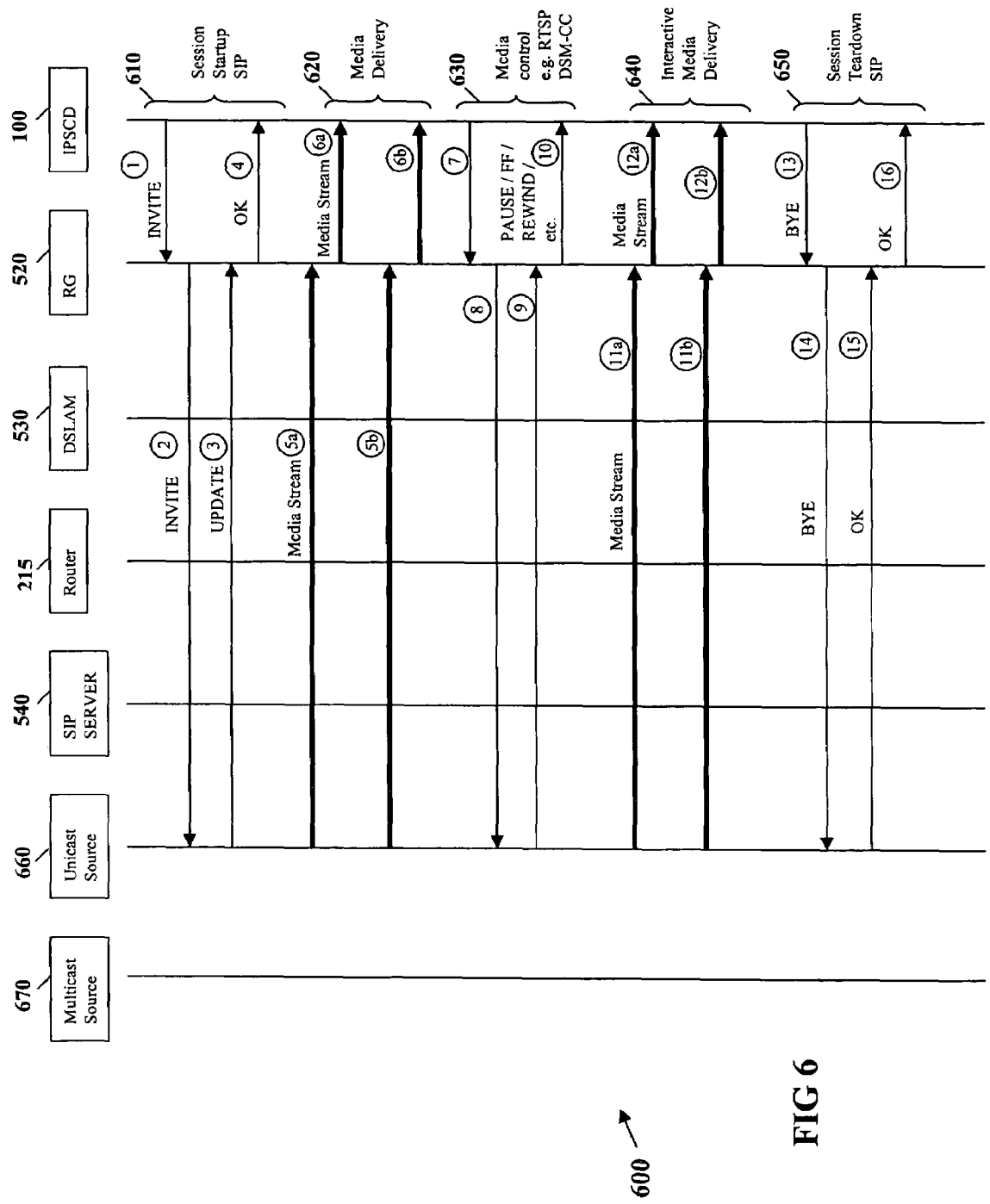
FIGS. 6-13 illustrate exemplary media sessions according to some of the embodiments of this invention.

FIG. 6 is a schematic illustrating an exemplary unicast media session 600. Here the residential gateway 520 knows the source for the unicast media session, and the customer is authorized to access this media source. When the customer desires a session, the multimedia device 100 communicates an SIP invite. The residential gateway receives and inspects the SIP invite and communicates the SIP invite to the unicast source 660. The residential gateway, however, only observes and forwards the SIP invite—the residential gateway does not alter/change the SIP invite. The SIP invite communicates to the communications network via the DSLAM 530. Various routers 215 route the SIP invite to an appropriate unicast video source 660 (also referred to as a "content source"). A server of the unicast source 560 responds with an "OK" or similar message indicating the SIP invite looks like a reasonable request and that the content can be supplied. The "OK" response return communicates to the residential gateway and forwards to the multimedia device 100 [Step 610, entitled "Session Startup SIP"]. The requested unicast media stream then communicates from the content server of the unicast source 560 to the residential gateway 520. The residential gateway 520 forwards the media stream to the multimedia device 100 [Step 620, entitled "Media Delivery"]. From the SIP message exchange, the residential gateway 520 has sufficient information to identify the unicast media stream and to associate it with the multimedia device 100 requesting the media. Because the residential gateway 520 has SIP abilities, the residential gateway 520 can appropriately self-configure the NAT function. From the SIP message exchange, the multimedia device 100 has sufficient information to identify the media stream and to present the media stream to the multimedia device. Further, during communication of the media stream, the customer may activate media control of the media stream via the residential gateway 520 to the unicast source 660 [Step 630, entitled "Media Control"]. For example, the customer may actuate a push button of the remote 306 to activate a fast-forward function, a rewind function, a pause function, a stop function, a bookmark function, a scene jump function, a status function, and an alternate presentation function. When the media control is activated, the multimedia device 100 communicates the selected presentation command to the unicast source 660 via the residential gateway 520, and the selected presentation command is processed by the IPSCD Management Module 110 to alter delivery of the media stream from the unicast source to the multimedia device 100 via the residential gateway 520 in accordance with the selected presentation command [Step 640, entitled "Interactive Media Deliver"]. Similarly, the customer may activate a communications preference of the media stream. For example, the customer may activate a push button of the remote 306 to terminate transmission of the media stream (see Step 650, entitled "Session Teardown Session"), to redirect communication of the media stream to yet another communications device (not shown), or to interrupt communication of the media stream.

The residential gateway 520 inspects the SIP invite and the "OK" response. Because the residential gateway 520 provides access to the customer's private IP address space, the gateway 520 uses a private address space (also referred to herein as a "private communications address"). That is, everything to the "left" of the residential gateway 520 is in a public address space. Under these circumstances the residential gateway 520 typically performs NAT (Network Address Translation) and/or a PAT (Port Address Translation) functions. The unicast source 660 essentially sees the network address of the residential gateway 520—not the multimedia device 100. The residential gateway 520 uses a different port number to keep track of the transaction that belongs to the multimedia device 100 as opposed to message flow related to another communications device in the private IP address space network.

The exemplary embodiments, however, allow the residential gateway 520 to inspect the SIP invite and "OK" response.. Because the residential gateway 520 can inspect for the SIP, the residential gateway 520 knows the port assignments and can configure itself to receive the media stream. When the media stream terminates, the residential gateway 520 needs to know what port number is assigned to the multimedia device 100. By inspecting the SIP invite and "OK" response the residential gateway 520 can self-configure for the dynamic port assignment. So, generally that sort of function would be considered as a SIP application layer gateway associated with the NAT/PAT function. The unicast source 660 selects the port to which it sends the media stream and associates that media stream with that particular SIP invite from the multimedia device 100. The residential gateway 520 needs to be aware of the SIP protocol in order to understand what port the media stream is coming in and that the media stream is coming in response to some request from inside the private network.

Figure 7:
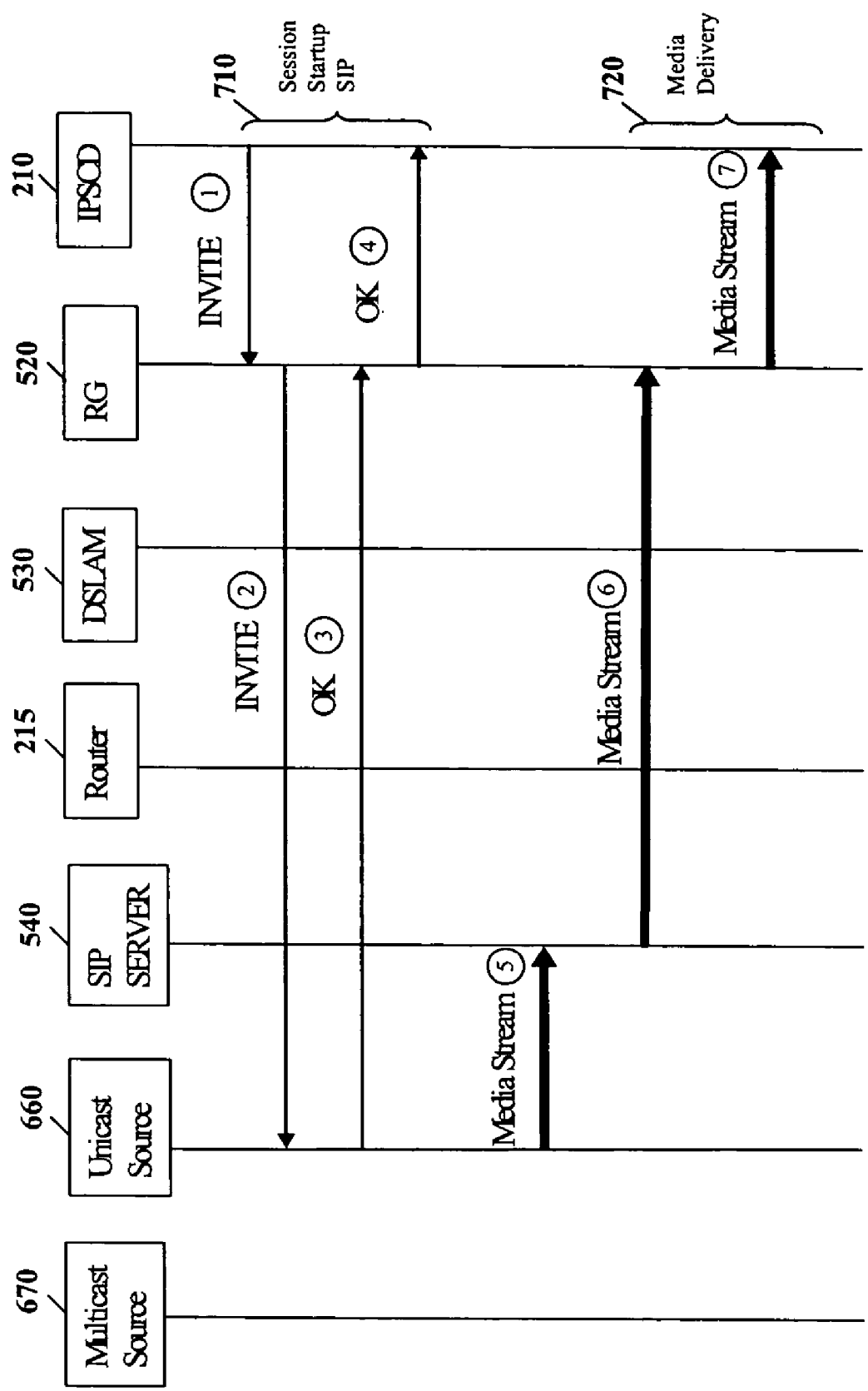

FIG. 7 is a schematic illustrating another exemplary unicast media session 700. Here, again, the residential gateway 520 knows the source for the unicast media session, and the customer is authorized to access this media source. The multimedia device 100 launches the SIP invite, the residential gateway 520 inspects the SIP invite, and the residential gateway 520 forwards the SIP invite to the appropriate unicast video source. The server of the unicast source 660 responds with an "OK" or similar message indicating the content can be supplied. The "OK" response return communicates to the residential gateway 520 and forwards to the multimedia device 100 [Step 710, entitled "Session Startup SIP"].

The unicast source 660 then communicates the requested media stream. As FIG. 7 shows, however, the SIP server 540 may intervene and receive the media stream. That is, the media stream communicates from the unicast source 660 to the SIP server 540. It may be that the SIP server 540 is performing the actual admission control of the media stream so that sub-servers may also have knowledge of whether or not a next media stream would exceed the capacities of the network at some place or another. It could be that only after the sub-server checks with the source that it becomes aware of the amount of bandwidth that's required or the location of the source. For whatever reasons, the SIP server 540 can perform an intervention function and intermediately receive the media stream. The SIP server 540 could then direct the media stream to the residential gateway 520. The residential gateway 520 then forwards the media stream to the multimedia device 100 [Step 720, entitled "Media Delivery"]

Figure 8:
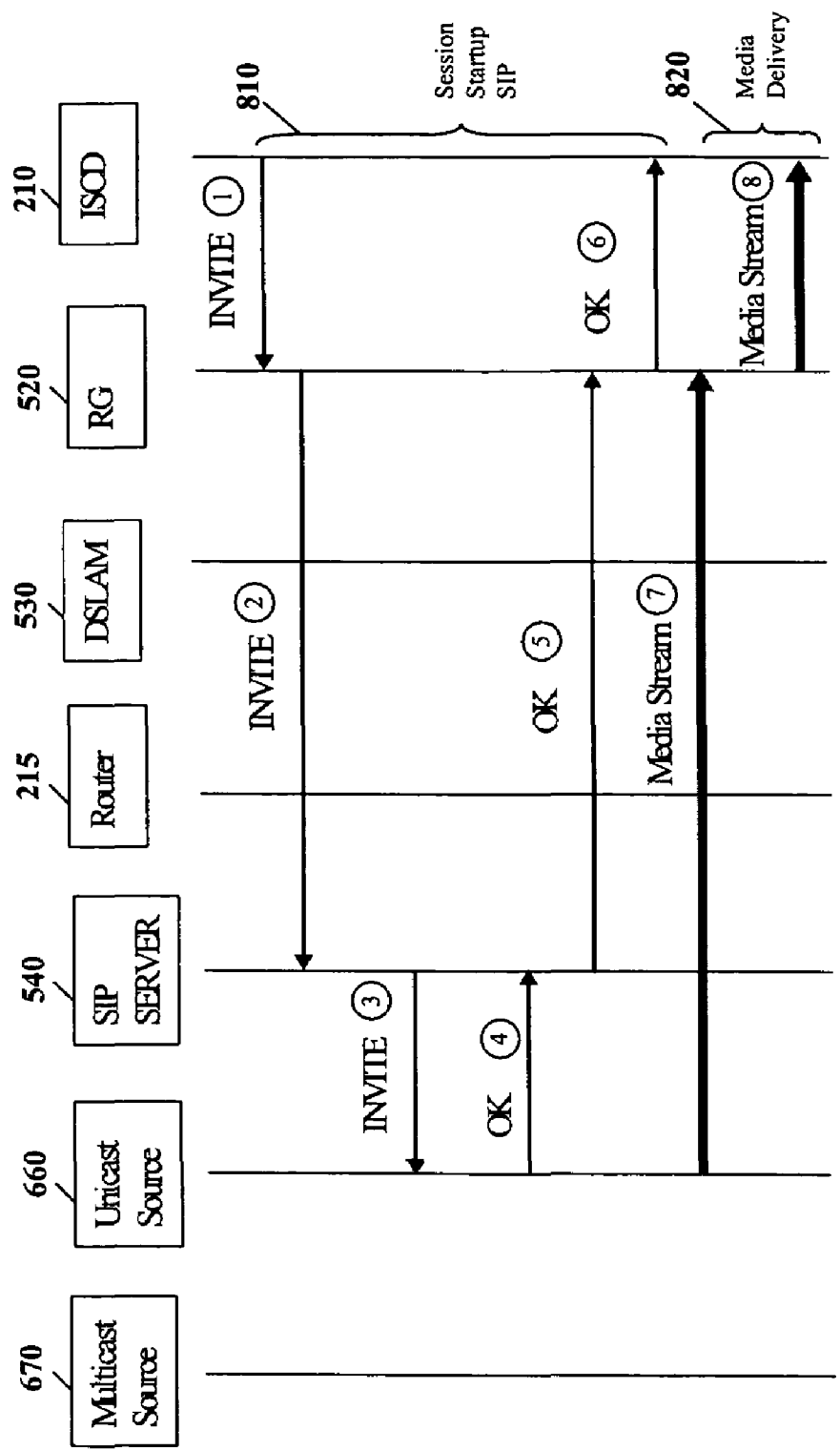

FIG. 8 is another schematic illustrating an exemplary unicast media session 800. Here, however, the residential gateway 520 does not know the source for the unicast media session. The multimedia device 100 launches the SIP invite to request some channel of media. The SIP invite, however, is directed to a name or a communications address that cannot be resolved by the residential gateway 520. The SIP invite, for example, may be a request to a name rather than a specific IP address. The residential gateway 520 may have no easy means to translate a domain name to an IP address. So, by default, the residential gateway 520 will not terminate the request, but, instead, pass the SIP invite to some other SIP server 540 in the communications network 210. That is, the residential gateway 520 forwards the SIP invite to a SIP server 540 in a hierarchy with the means to resolve the name. FIG. 8, then, illustrates the residential gateway 520 forwarding the SIP invite to the SIP server 540, and the SIP server 540 performs a DNS lookup or alternate similar function. Perhaps the SIP server 540 has access to some other database that maps the desired channel or content to an alternate unicast content server. The SIP server 540 then redirects the SIP invite to the appropriate media server (e.g., the unicast source 660 ). One advantage of using domain names is that a manufacturer of the multimedia device 100 may want a more user-friendly interface that uses names that are human readable rather than IP addresses. Another advantage might be a load balancing function that the SIP server 540 may perform—although the same media may be available from several video servers, the SIP server 540 may desire to utilize the geographically closest resource. Whatever the reasons, the SIP server 540 discovers the appropriate unicast source 660 and directs the SIP invite to that source 660. The unicast source 660 responds with the "OK" response.

The SIP server 540 may further intervene. As FIG. 8 shows, the SIP server 540 intervenes and intercepts the "OK" response from the unicast source 660. It may be that the SIP server 540 first checks network capacity and then, in return, communicates the "OK" response. If, however, the communications network lacked capacity, the SIP server 540 would return some kind of busy or queued indication (or alternate indication, such as that the services are unavailable). For whatever reason, the SIP server 540 intervenes to direct the "OK" response to the residential gateway 520, and the residential gateway 520 forwards the "OK" to the multimedia device 100 [Step 810, entitled "Session Startup SIP"]. The unicast source 660 then communicates the media stream to the residential gateway 520, and the residential gateway 520 forwards to the media stream to the multimedia device 100 for delivery/presentation [Step 820, entitled "Media Delivery"].

Figure 9:
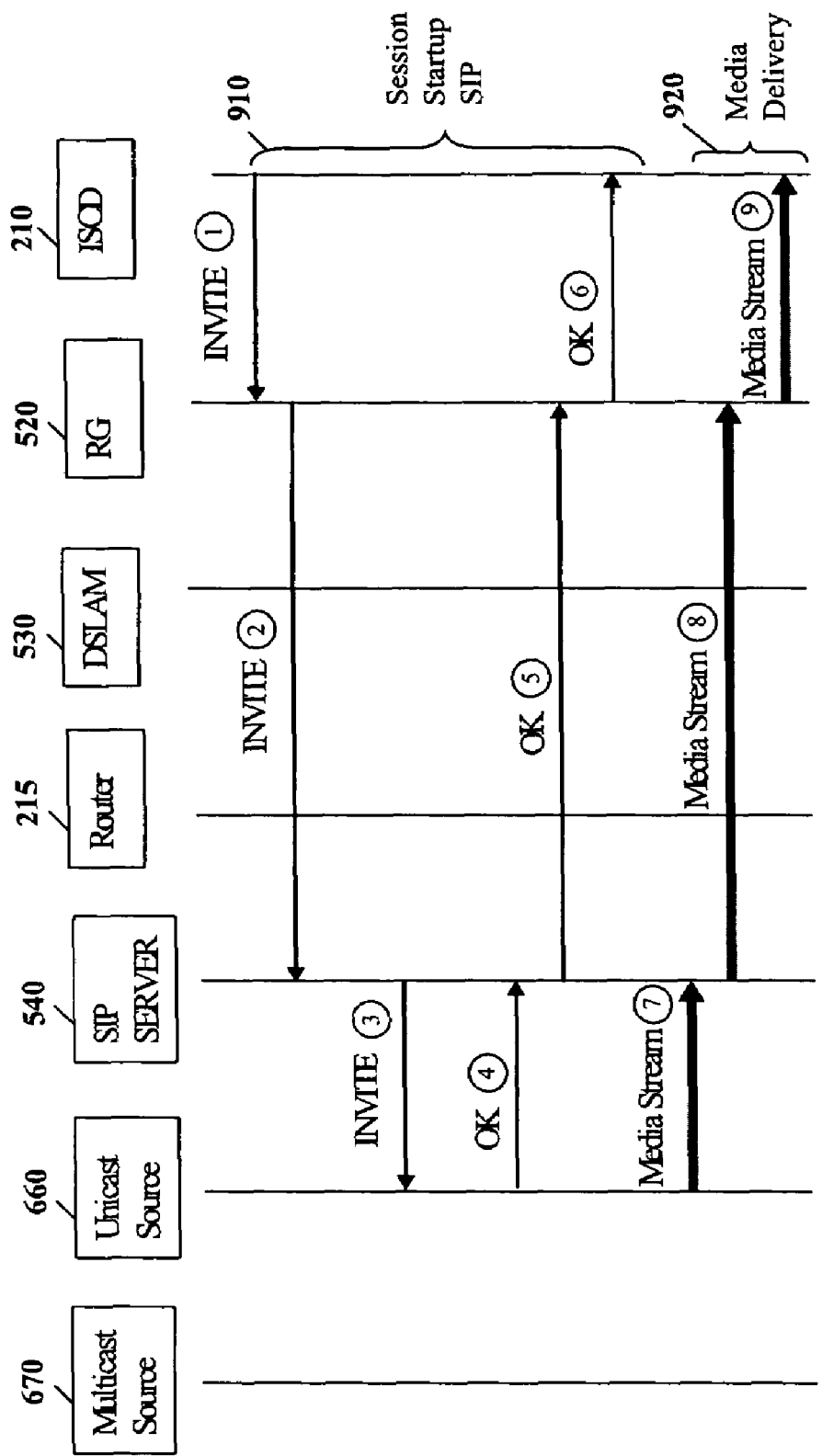

FIG. 9 is another schematic illustrating still another exemplary unicast media session 900. Here, again, the residential gateway 520 does not know the source for the unicast media session. FIG. 9, however, shows the SIP server 540 intervening to receive the media stream. The multimedia device 100 launches the SIP invite to a name or an address that can't be resolved by the residential gateway 520. The residential gateway 520 passes the SIP invite to the SIP server 540, and the SIP server 540 performs a DNS lookup. The SIP server 540 then redirects the SIP invite to the appropriate media server. The SIP server 540 intervenes and intercepts the "OK" response from the unicast source 660 and then directs the "OK" response to the residential gateway 520. The residential gateway 520 forwards the "OK" response to the multimedia device 100 [Step 910, entitled "Session Startup SIP"].

As FIG. 9 also shows the SIP server 540 may intervene in the media stream. Once the end points set-up the session (e.g., the unicast source 660 and the residential gateway 520 and/or the multimedia device 100 exchange SIP messages), the unicast source 660 delivers the requested media stream. The SIP server 540, however, may intervene and receive the media stream from the unicast source 660. The SIP server 540 may dynamically measure/evaluate bandwidth consumption and network conditions. The SIP server 540 may perform, or assist in, billing routines for the requested media stream. For whatever reasons, the SIP server 540 intervenes and forwards the media stream to the residential gateway 520. The residential gateway 520 then directs the media stream to the multimedia device 100 [Step 920, entitled "Media Delivery"].

Figure 10:
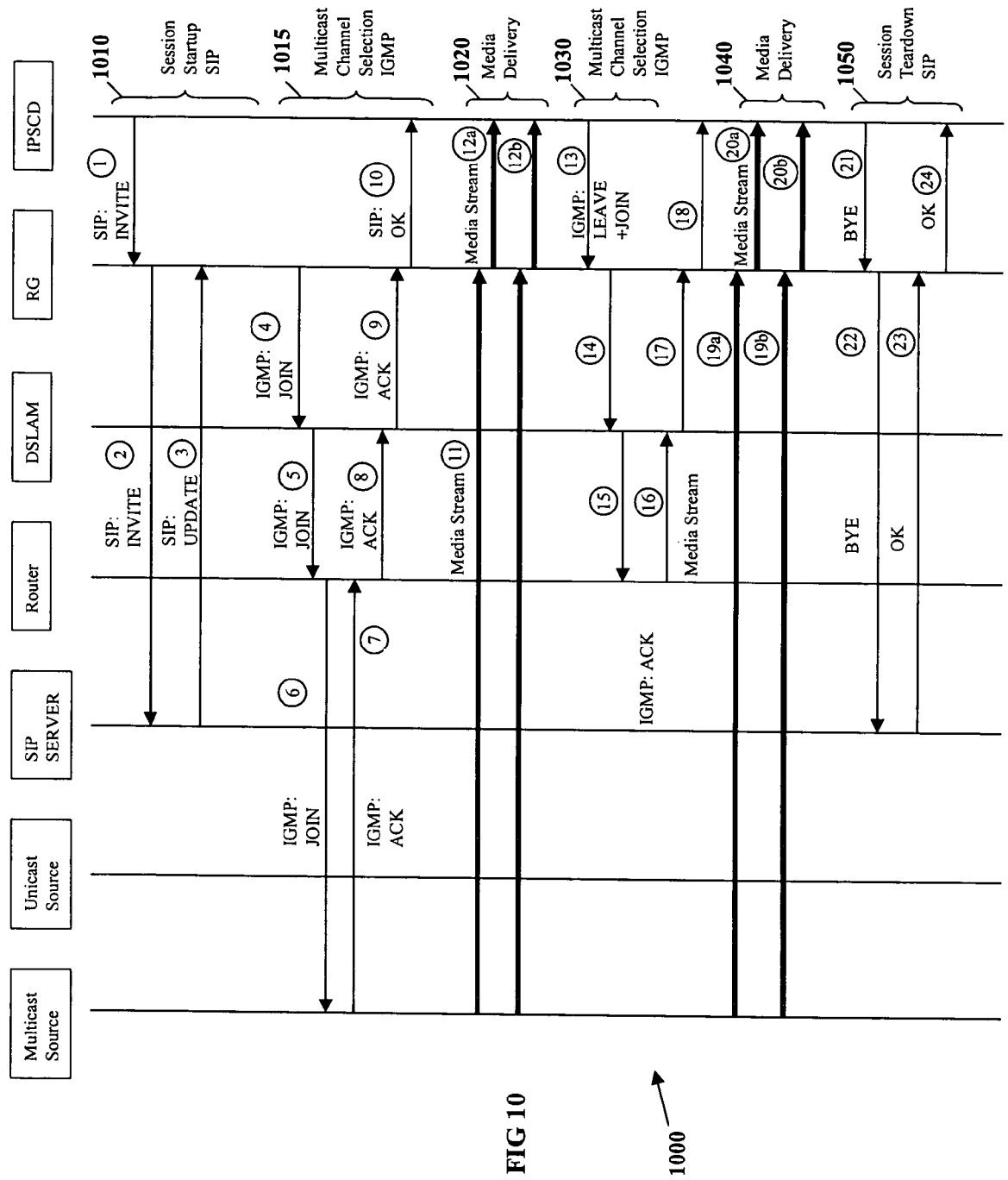

FIG. 10 is a schematic illustrating a multicast media session 1000 according to some of the exemplary embodiments. Here the residential gateway 520 knows the source for the multicast media session, and the customer is authorized to access this media source. When the customer desires a session, the multimedia device 100 communicates the SIP invite. The residential gateway 520 receives and inspects the SIP invite and determines that the SIP invite is associated with an authorized multicast source 670 [Step 1010, entitled "Session Startup SIP"]. Thereafter, the residential gateway 520 generates an Internet Group Management Protocol (IGMP) join that is communicated to the DSLAM 530. The DSLAM 530 receives and forwards the IGMP join to one or more routers 215. Various routers 215 within the communications network route the IGMP join to the appropriate multicast video source 670. The IGMP may be used symmetrically or asymmetrically, such as asymmetric protocol used between multicast routers 215. Thereafter, a content server of the multicast source 670 responds with an IGMP acknowledgement (referred to as "IGMP ACK" in the figures) or similar message indicating the IGMP join looks like a reasonable request and that the content can be supplied. The IGMP acknowledgement is communicated to the routers 215, from the routers 215 to the DSLAM 530, then from the DSLAM 530 to the residential gateway 520. The residential gateway 520 converts the IGMP acknowledgment to an SIP protocol "OK" and forwards the "OK" to the multimedia device 100 [Step 1015, entitled "Multicast Channel Selection IGMP"]. The requested multicast media stream then communicates from the appropriate multicast source 670 to the residential gateway 520. The residential gateway 520 forwards the media stream to the multimedia device 100 [Step 1020, entitled "Media Delivery"]. Further, during communication of the media stream, the customer may activate media control of the media stream to control presentation and/or communication of the media stream (see Steps 1030, 1040, and 1050, respectively entitled "Multicast Channel Selection IGMP," "Media Delivery," and "Session Teardown").

The residential gateway 520 converts the SIP invite from the multimedia device 100 of the customer's private IP address space to the IGMP join to a public address space and, similarly, converts the IGMP acknowledgement response from the public base to the SIP "OK" to the multimedia device 100 of the customer's private IP address space. Under these circumstances the residential gateway 520 typically performs NAT (Network Address Translation) and/or a PAT (Port Address Translation) functions. The multicast source 670 sees the network address of the residential gateway 520—not the multimedia device 100. The residential gateway 520 uses different port numbers to keep track of the transactions that belong to the multimedia device 100 as opposed to message flow related to another communications device in the private IP address space network.

The exemplary embodiments, however, allow the residential gateway 520 to inspect the IGMP join and IGMP acknowledgement responses. Because the residential gateway 520 can inspect, the residential gateway 520 knows the port assignments and can configure itself to receive the media stream. When the media stream terminates, the residential gateway 520 needs to know what port number is assigned to the multimedia device 100. By inspecting the IGMP join and IGMP acknowledgement responses the residential gateway 520 can self-configure for the dynamic port assignment. So, generally, that sort of function would be considered as a SIP application layer gateway associated with the NAT/PAT function. The multicast source 670 selects the port to which it sends the media stream and associates that media stream with that particular IGMP join converted from the SIP invite of the multimedia device 100. The residential gateway 520 needs to be aware of the IGMP protocol in order to understand into what port the media stream is coming and that the media stream is coming in response to some request from inside the private network.

Figure 11:
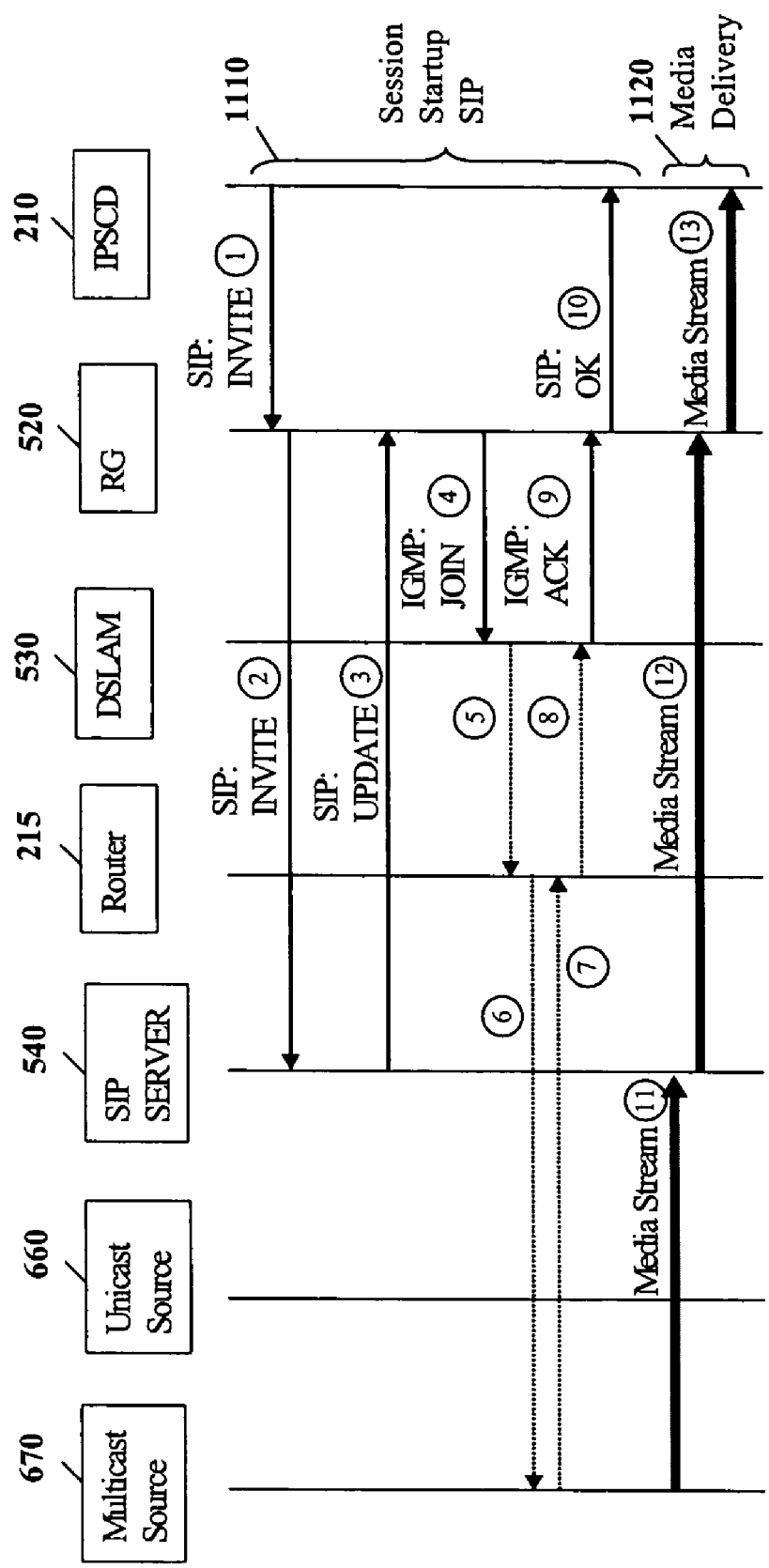

FIG. 11 is a schematic illustrating yet another exemplary a multicast media session 1100. Here, again, the residential gateway 520 knows the source for the multicast media session, and the customer is authorized to access this media source. The multimedia device 100 launches the SIP invite. The residential gateway 520 inspects and uses the SIP invite to generate an IGMP join and forwards the IGMP join via the SIP Server to the DSLAM 530. That is, the SIP server 540 acts as a border gateway between the IGMP join from the residential gateway 520 to the DSLAM 530. Thereafter, the DSLAM 530 forwards the IGMP invite to one or more network routers 215, and the router(s) forward(s) the IGMP join to the appropriate multicast source 670. The content server of the multicast source 670 responds with an IGMP acknowledgement or similar message indicating the content can be supplied. The IGMP acknowledgement return communicates to routers 215, from the routers 215 to the DSLAM 530, and from the DSLAM 530 to the residential gateway 520. The residential, gateway 520 receives the IGMP acknowledgement providing it with sufficient information to perform its NAT function and forwards an SIP "OK" to the multimedia device 100 [Step 1110, entitled "Session Startup SIP"].

The multicast source 670 then communicates the requested media stream. As FIG. 11 shows, however, the SIP server 540 may intervene and receive the media stream. That is, the media stream communicates from the multicast source 670 to the SIP server 540. Similar to above, it may be that the SIP server 540 is performing the actual admission control of the media stream so that sub-servers may also have knowledge of whether or not a next media stream would exceed the capacities of the network at some place or another. It could also be that only after the sub-server checks with the source that it becomes aware of the amount of bandwidth that is required or the location of the source. For whatever reasons, the SIP server 540 can perform an intervention function and intermediately receive the media stream. The SIP server 540 could then direct the media stream to the residential gateway 520. The residential gateway 520 then forwards the media stream to the multimedia device 100 [Step 1120, entitled "Media Delivery"].

Figure 12:
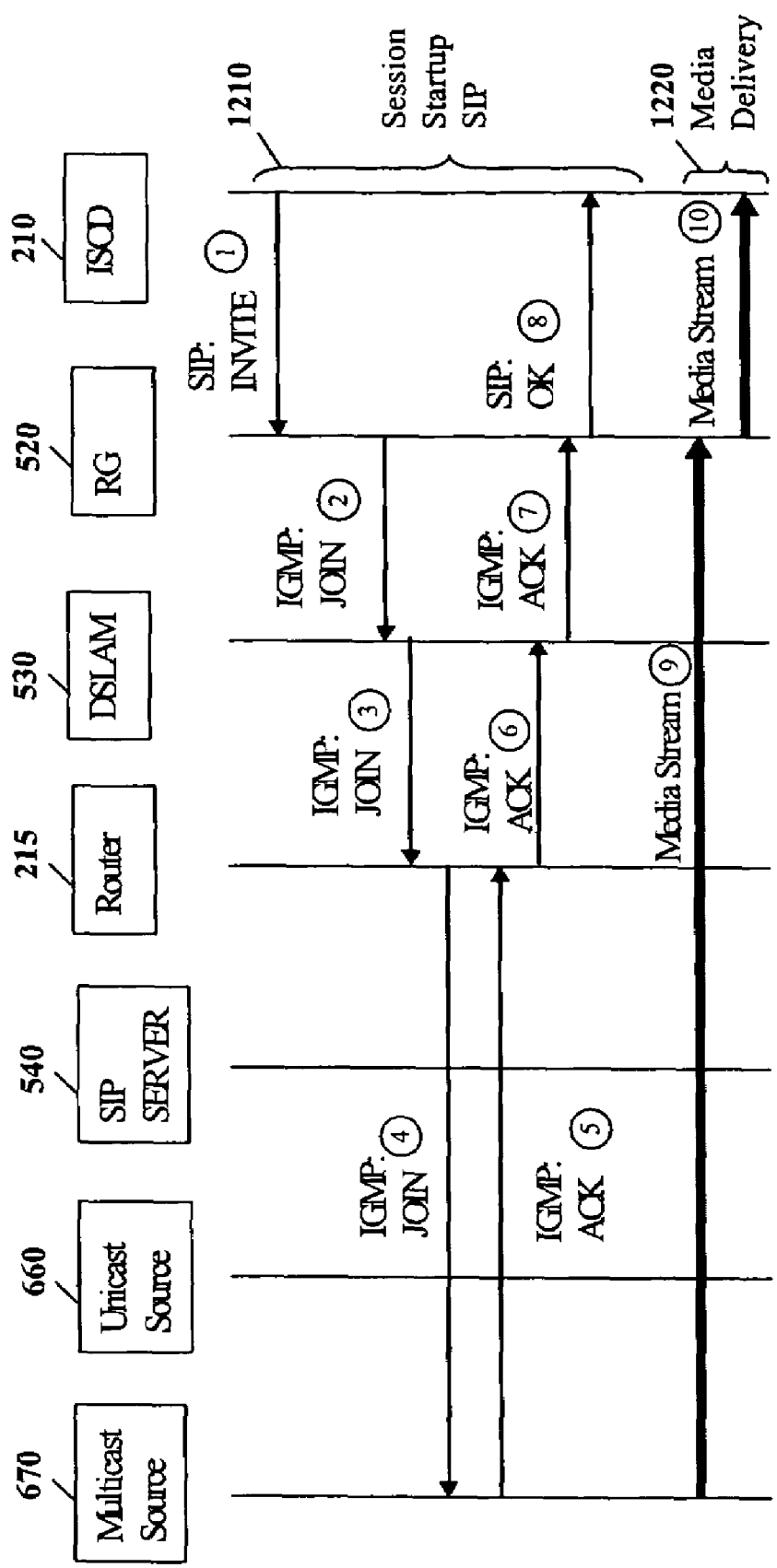

FIG. 12 is another schematic illustrating a multicast media session 1200 according to further exemplary embodiments. Here, however, the residential gateway 520 does not know the source for the multicast media session. The multimedia device 100 launches the SIP invite to request some channel of media. The SIP invite, however, is directed to a name or an address that can't be resolved by the residential gateway 520. The SIP invite, for example, may be a request to a name rather than a specific IP address. The residential gateway 520 may have no easy means to translate a domain name to an IP address. So, by default, the residential gateway 520 will not terminate the request, but, instead, the residential gateway 520 passes the SIP invite to a SIP server 540 in the communications network. That is, the residential gateway 520 forwards the SIP invite to a SIP server 540 in a hierarchy with the means to resolve the name. FIG. 10, then, illustrates the residential gateway 520 forwarding the SIP invite to the SIP server 540, and the SIP server 540 performs a DNS lookup. Similar to above, the SIP server 540 may have access to some other database that maps the desired channel or content to a particular content server. The SIP server 540 then forwards the source address (referred to as the "SIP UPDATE" the figures) to the residential gateway 520. Similar to the session flow described in the above embodiments, the residential gateway 520 uses the SIP UPDATE to generate an IGMP join to the DSLAM 530. Next the DSLAM 530 receives the IGMP join and communicates the IGMP join to one or more network routers 215, and the router(s) 215 communicates the IGMP join to the multicast source 670 (e.g., the content server). Thereafter, the multicast source 670 responds with an IGMP acknowledgement communicated to the router, from the router to the DSLAM 530, then from the DSLAM 530 to the residential gateway 520. The residential gateway 520 converts the IGMP acknowledgment to an SIP protocol "OK" and forwards the "OK" to the multimedia device 100 [Step 1210, entitled "Session Startup SIP"]. The requested multicast media stream then communicates from the appropriate multicast content server 560 to the residential gateway 520. The residential gateway 520 communicates the media stream to the multimedia device 100 [Step 1220, entitled "Media Delivery"].

Figure 13:
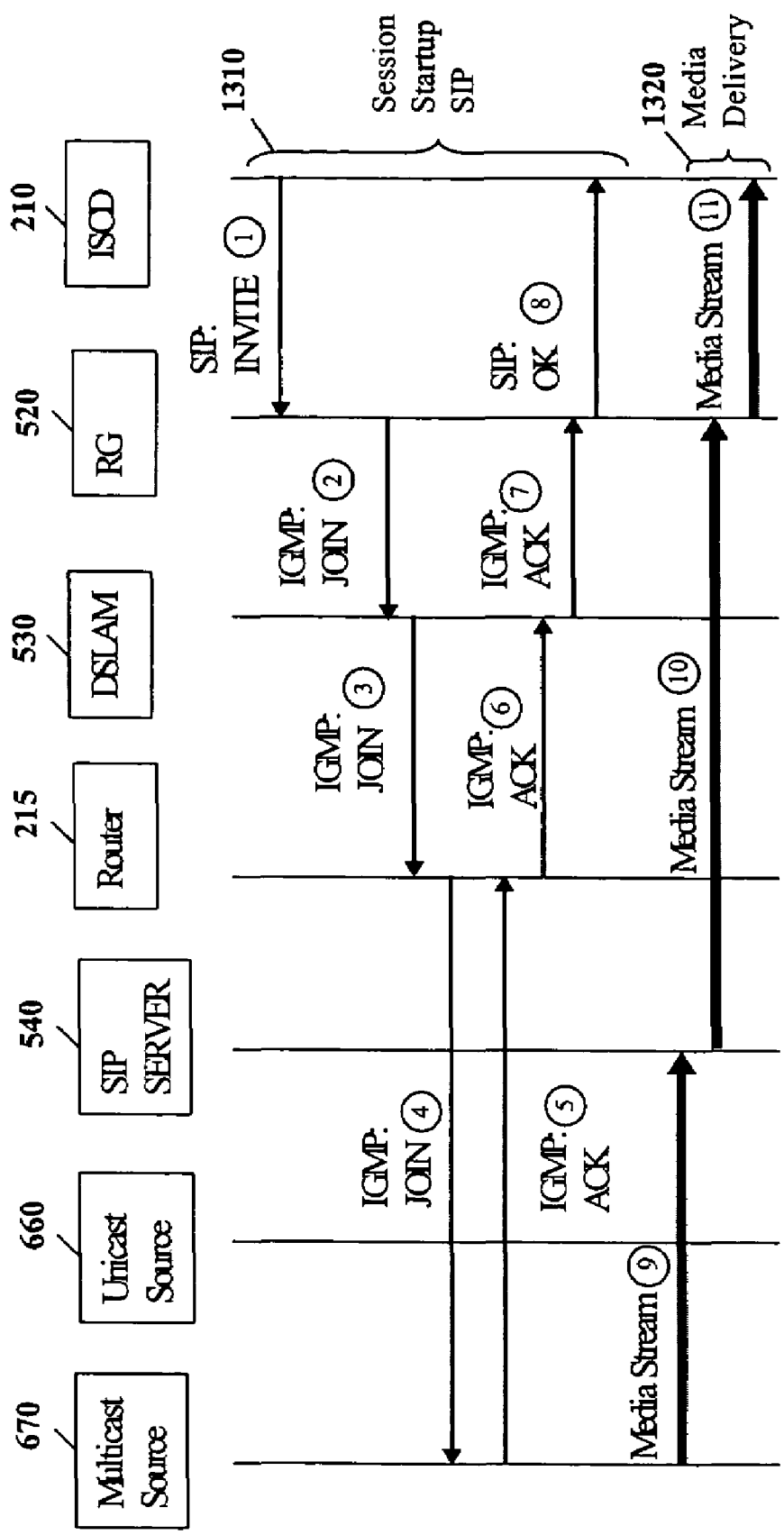

FIG. 13 illustrates another exemplary multicast media session 1300 similar to the multicast session 1200 of FIG. 12. Here, however, the multicast media session 1300 shows an alternate route of the media stream from the multicast source 670. As FIG. 13 illustrates, the SIP server 540 intervenes in the media stream. Once the multicast source 670 initiates the media stream to the residential gateway 520, the SIP server 540 intervenes and receives the media stream from the multicast source 670. The SIP server 540 may dynamically measure/evaluate bandwidth consumption and network conditions. The SIP server 540 may perform, or assist in, billing routines for the requested media stream. For whatever reasons, the SIP server 540 intervenes and forwards the media stream from the multicast source 670 to the residential gateway 520 that converts the IGMP acknowledgement to an SIP "OK" to communicate with the multimedia device 100 [step 1310, entitled "SIP Session Startup"]. The residential gateway 520 then directs the media stream to the multimedia device 100 [Step 1320, entitled "Media Delivery"].

The IPSCD Management Module (shown as reference numeral 110 in FIGS. 1 and 3-4) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mentioned here but considered within the scope of this invention, allow the IPSCD Management Module to be easily disseminated.

Still in further exemplary embodiments, the IPSCD Management Module may be physically embodied on or in any addressable (e.g., HTTP, I.E.E.E. 802.11, Wireless Application Protocol (WAP)) wireless device capable of engaging in a session initiation protocol communication or other similar communication. Examples could include a computer, a wireless personal digital assistant (PDA), an Internet Protocol phone, and/or a wireless pager (some of these exemplary embodiments are shown in the figures).

While several exemplary implementations of embodiments of this invention are described herein, various modifications and alternate embodiments will occur to those of ordinary skill in the art. For example, other protocol requests for a media stream, such as Hyper-Text Transfer Protocol (HTTP) and/or other protocols utilizing various formats, such as URL formats, Extensible Style Sheet (XSL) formats, Real Simple Syndication (RSS) that uses XML structures, and others may be similarly used to communicate orders from the private address of the multimedia device to a content source. Accordingly, this invention is intended to include those other variations, modifications, and alternate embodiments that adhere to the spirit and scope of this invention.

| Abbreviations & Additional Descriptions | |
|---|---|
| ALG | Application Layer Gateway |
| AS | Autonomous System |
| BRAS | Broadband Remote Access Server |
| CoS | Class of Service |
| DHCP | Dynamic Host Configuration Protocol |
| DNS | Domain Name Server |
| DSLAM | Digital Subscriber Line Access Module |
| DSM-CC | Digital Storage Media Command and Control |
| IGMP | Internet Group Membership Protocol |
| IP | Internet Protocol |
| IPSCD | Internet Protocol Service Consumer Device (also referred to as ISCD) |
| TVoIP | IP TeleVision |
| MPEG | Motion Picture Experts Group |
| NAT | Network Address Translation |
| PAT | Port Address Translation |
| QoS | Quality of Service |
| RG | Residential Gateway |
| RSVP | Resource reSerVation Protocol |
| RTP | Real-time Transport Protocol |
| RTSP | Real Time Streaming Protocol |
| SIP | Session Initiation Protocol |
| STB | Set Top Box |
| TCP | Transmission Control Protocol |
| TVoIP | Television over Internet Protocol |
| UDP | User Datagram Protocol |
| URL | Uniform Resource Locator |
| VoD | Video on Demand |

What is claimed is:

1. A method for providing media delivery services comprising:
   receiving a session initiation protocol invitation from a multimedia device to request a media stream from a source, the invitation further comprising a private communications address for communicating with the multimedia device;
   communicating the session initiation protocol invitation via a communications network;
   wherein communicating the session initiation protocol invitation is performed by a residential gateway, wherein the residential gateway forwards the session initiation protocol invitation to multimedia content server when the residential gateway recognizes the source and the residential gateway forwards the session initiation protocol invitation to a session initiation protocol server to resolve the source when the residential gateway does not recognize the source;
   receiving a session initiation protocol confirmation from the multimedia content server via the communications network to communicate the media stream, the confirmation further comprising a communications identifier for identifying the media stream;
   communicating the session initiation protocol confirmation to the multimedia device generating the session initiation protocol invitation to request the media stream;

receiving and identifying the media stream from the multimedia content server via the communications network; and communicating the media stream to the private communications address of the multimedia device;

wherein the multimedia content server is a multicast source, and wherein communicating the session initiation protocol invitation to the multicast source via the communications network comprises translating the session initiation protocol invitation to an internet group management protocol join and communicating the internet group management protocol join to the multicast source via the communications network, and wherein receiving the session initiation protocol confirmation from the multimedia source via the communications network comprises receiving an internet group management protocol acknowledgement via the communications network, the acknowledgement further comprising the communications identifier for identifying the media stream.

2. A method for providing the media stream to a multimedia system comprising:

initiating an order for the media stream from a source via a session initiation protocol invitation over a communications network, wherein at least one multicast multimedia content server accesses, stores, and manages the media stream;

wherein a residential gateway forwards the session initiation protocol invitation to the multimedia content server when the residential gateway recognizes the source and the residential gateway forwards the session initiation protocol invitation to a session initiation protocol server to resolve the source when the residential gateway does not recognize the source;

translating the session initiation protocol invitation to an internet group management protocol join;

communicating the internet group management protocol join to order the media stream from the at least one multicast multimedia content server;

receiving an internet group management protocol acknowledgement via the communications network, the acknowledgement further comprising a communications identifier for identifying the media stream;

identifying the media stream; and communicating the media stream to a private communications address of a multimedia device.

* * * * *